(12) United States Patent
Schmid (10) Patent No.: US 7,936,145 B2
(45) Date of Patent: May 3, 2011

(54) ELECTRONICALLY COMMUTATED ASYNCHRONOUS MOTOR

(75) Inventor: Harald Schmid, Emmingen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 494 days.

(21) Appl. No.: 12/112,130

(22) Filed: Apr. 30, 2008

(65) Prior Publication Data

US 2008/0284364 A1 Nov. 20, 2008

(30) Foreign Application Priority Data

May 14, 2007 (DE) .......................... 10 2007 024 244
Aug. 15, 2007 (DE) .......................... 10 2007 039 366

(51) Int. Cl.
*H02P 1/24* (2006.01)
(52) U.S. Cl. ......... 318/727; 318/783; 318/798; 318/471
(58) Field of Classification Search .................. 318/727, 318/772, 783, 798, 822, 823, 825, 471, 472, 318/473

See application file for complete search history.

(56) References Cited

U.S. PATENT DOCUMENTS

| | | | | |
|---|---|---|---|---|
| 3,848,466 | A | 11/1974 | Dial et al. .......................... | 73/349 |
| 4,567,419 | A | 1/1986 | Watanabe ...................... | 318/798 |
| 5,119,071 | A * | 6/1992 | Takezawa et al. ............. | 318/130 |
| 5,313,151 | A * | 5/1994 | Ogden et al. .................. | 318/805 |
| 5,418,451 | A | 5/1995 | Maass et al. ................ | 324/158.1 |
| 5,811,957 | A * | 9/1998 | Bose et al. ...................... | 318/802 |
| 6,718,273 | B1 | 4/2004 | Tschentscher et al. ......... | 702/64 |
| 7,199,549 | B2 * | 4/2007 | Kleinau et al. ................ | 318/798 |
| 7,268,514 | B2 * | 9/2007 | DeLange et al. .............. | 318/757 |
| 7,475,557 | B2 | 1/2009 | Yoshioka et al. ............... | 62/175 |
| 7,770,406 | B2 | 8/2010 | Yoshioka et al. ............... | 62/199 |

FOREIGN PATENT DOCUMENTS

| | | |
|---|---|---|
| DE | 3205460 | 2/1983 |
| DE | 41 37 559 | 5/1993 |
| DE | 195 39 711 A | 4/1997 |
| DE | 199 42 205 A1 | 3/2001 |
| EP | 0 780 964 A2 | 6/1997 |
| EP | 0 780 964 B1 | 9/2004 |
| GB | 2 261 518 A | 5/1993 |
| JP | 10-174276 A | 6/1998 |

(Continued)

OTHER PUBLICATIONS

Pat. Abs. of Japan, abstracting JP-62-104 453-A, Nagashima, publ. May 14, 1987 (1 page).

(Continued)

*Primary Examiner* — Walter Benson
*Assistant Examiner* — Thai Dinh
(74) *Attorney, Agent, or Firm* — Milton Oliver, Esq.; Oliver Intellectual Property LLC (57) ABSTRACT

An electronically commutated asynchronous motor (12) features a stator (202), a short-circuit rotor (204), a controller (FOR 20) for field-oriented regulation of the motor (12), a sensor magnet (274) in thermally conductive connection with the short-circuit rotor (204), a rotor position sensor (14A; 18; 18') arranged at a predetermined distance (d) from the sensor magnet (274) to generate an output signal (HALL, U, U1, U2) that is dependent upon the spatial orientation of the sensor magnet (274), and a temperature evaluation apparatus (CALC_T 44) configured to ascertain, during operation, from the sensor output signal (HALL, U, U1, U2), a temperature value (T) that characterizes a temperature (T_SM, T_S) in the motor (12).

25 Claims, 7 Drawing Sheets

FOREIGN PATENT DOCUMENTS

| | | |
|---|---|---|
| JP | 2004-222387 A | 8/2004 |
| JP | 2005 061709 A | 3/2005 |

OTHER PUBLICATIONS

Wikipedia article "Giant Magnetoresistance," 2 pp. updated Apr. 11, 2008, retrieved Apr. 30, 2008.
Wikipedia article "Magnetoresistance," 1 page, last modified Feb. 16, 2008.
Philips Semiconductors, "KMZ43T Magnetic Field Sensor" 9-page datasheet dated Sep. 15, 2003.
Sensitec GmbH, "GF705 Magnetoresistive Field Sensor," 5-page datasheet dated May 3, 2007.
Asahi Kasei EMD Corp. "HW-101A InSb Hall Element," 2-page datasheet , date unknown.
Patent Abs. of Japan, abstract of JP 10-174276-A, Jun. 26, 1998.
Patent Abs. of Japan, abstract of JP 2004-222387-A, Aug. 5, 2004.
Patent Abs. of Japan, abstract of JP 2005-061709-A, Mar. 10, 2005.

* cited by examiner

ELECTRONICALLY COMMUTATED ASYNCHRONOUS MOTOR

CROSS-REFERENCE

This application claims priority of German patent applications DE 10 2007 024 244.3 & 10 2007 039 366.2, filed respectively 14 May 2007 and 15 Aug. 2007, the entire contents of which are hereby incorporated by reference.

FIELD OF THE INVENTION

The invention relates to an electronically commutated asynchronous motor (ASM) having a stator, a short-circuit rotor, and a controller for field-oriented regulation (FOR) of said motor.

BACKGROUND

Sensing of the electrical parameters of asynchronous motors (ASMs) is important for field-oriented regulation of the motors that are produced.

Although field-oriented regulation (FOR) of asynchronous motors is known, its vulnerability or sensitivity to changes in parameters represents a problem that has not satisfactorily been solved. In FOR, regulation takes place in a coordinate system oriented on the rotor-flux space-vector, so that the flux-forming and torque-forming current components can be influenced separately. The instantaneous position and instantaneous absolute value of the rotor-flux space-vector are usually determined with the aid of an analog or digital software model of the motor. All the rotor-flux estimating methods which are based upon a model have the disadvantage, however, that the parallel model can correctly reproduce the motor state only when the parameter values used in the software model agree with the instantaneous parameter values in the particular motor being operated.

During operation, the stator resistance and rotor resistance can change by up to 50% as a function of temperature. Changes in main inductance must be compensated for when the ASM is also operated in the field-weakening region.

SUMMARY OF THE INVENTION

It is therefore an object of the invention to provide a novel electronically commutated asynchronous motor that is particularly adapted to operate using field-oriented regulation.

According to the present invention, this object is achieved by building the motor with a short-circuit rotor which is in thermally conductive relation to a sensor magnet, arranging a rotor position sensor at a predetermined distance from the sensor magnet to produce an output signal dependent upon the spatial orientation of the sensor magnet, evaluating the output signal to ascertain a motor temperature, and using the ascertained motor temperature and the rotor position output signal in a controller for field-oriented regulation (FOR) of the motor. The temperature of the rotor can thereby very easily be measured in a contact-free manner.

A preferred refinement is to employ a galvanomagnetic sensor as the rotor position sensor. The use of a galvanomagnetic rotor position sensor enables a measurement of the temperature of the sensor magnet, and thus allows inferences as to the motor's temperature.

A further preferred refinement is to employ a magnetoresistive sensor as the rotor position sensor. The use of a magnetoresistive sensor enables, for example, a simultaneous measurement of temperature and of rotational angle or position of the rotor, and thus reduces cost.

A further manner of achieving the object is to place the sensor magnet in thermally conductive relation with the short-circuit rotor, so that the magnetic flux density generated by the sensor magnet in the galvanomagnetic rotor position sensor varies with sensor magnet temperature, and the rotor position output signal amplitude thus becomes a function of temperature. This measurement is based on arranging the sensor magnet in thermally conductive connection with the short-circuit rotor, so that the magnetic flux density generated by said sensor magnet is a direct function of rotor temperature.

Because individual motors differ from one another as produced, it is particularly advantageous to calibrate or compensate at the end of motor fabrication, i.e. during production, motor-specific data are stored in a permanent memory, and this measurement and storage occur at a standardized motor temperature, usually at 20° C. with the aid of these stored data, the temperature that is sensed at the galvanomagnetic sensor can then reliably be calculated, and a motor model is obtained that enables accurate field-oriented regulation.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 1:
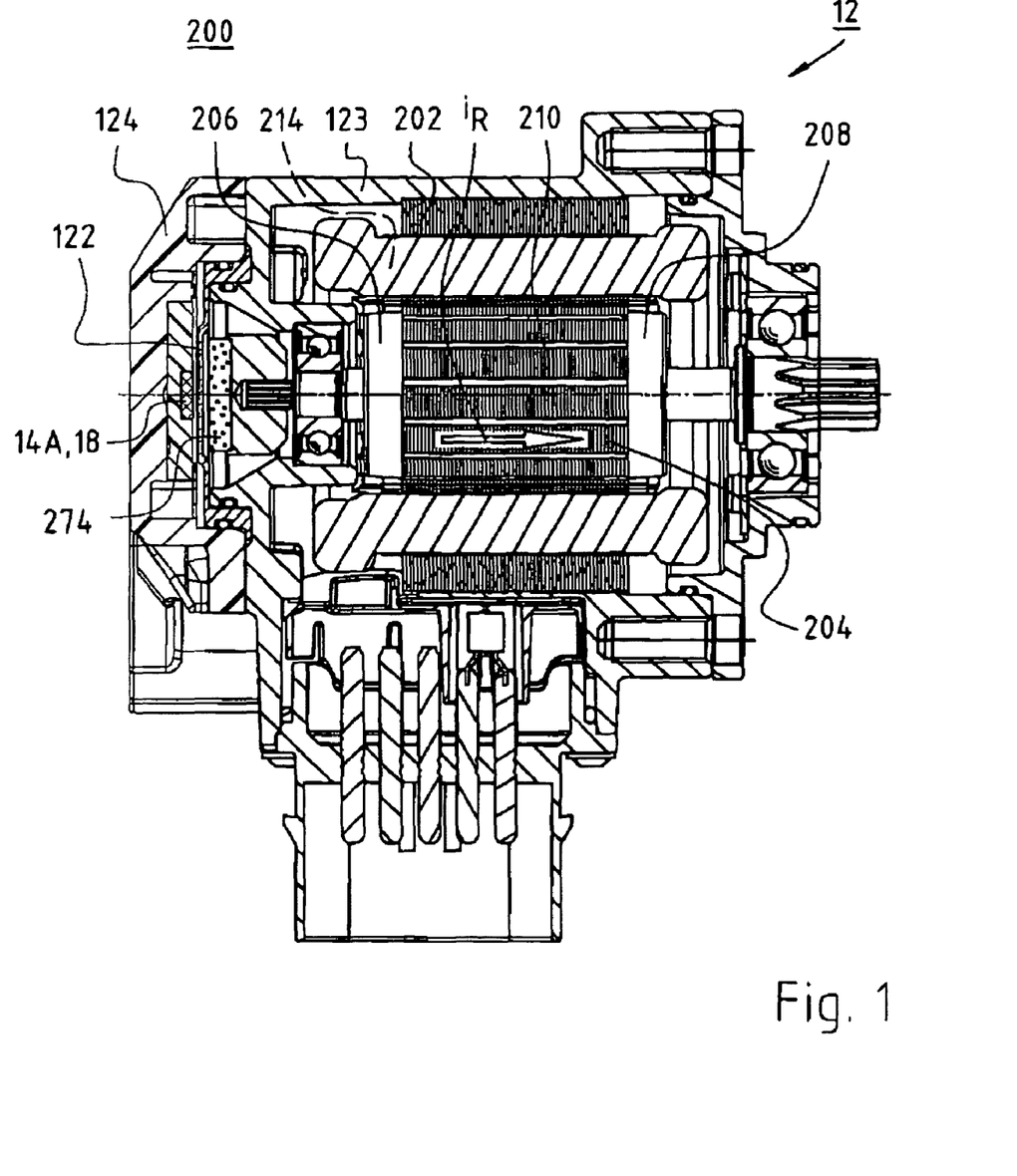
FIG. 1 shows a geared motor 200 that operates with field-oriented regulation (FOR)

FIG. 1 shows the basic design of a geared motor 200 that contains a three-phase ASM 12. Said motor has a motor housing 123, a stator 202 having a three-phase winding, a rotor 204 that is implemented as a so-called short-circuit rotor, and a sensor arrangement 14A, 18 that preferably sits on a circuit board and is surrounded on the outer side by a sensor housing 124. Rotor 204 has a short-circuit ring 206 at the left end, and a short-circuit ring 208 at the right end. Rings 206, 208 are connected in the usual way by short-circuit bars 210 to form a cage in which a rotor current $i_R$ flows during operation, the magnitude of said current being dependent on the temperature of rotor 204 because the resistance of bars 210 increases with increasing temperature. For this reason, the level of the current must be adapted as a function of the rotor temperature and, for this reason, a temperature sensor (the position of which is indicated with the reference character 214) has hitherto been integrated into the stator winding, said sensor indirectly sensing the temperature of rotor 204.

Figure 2:
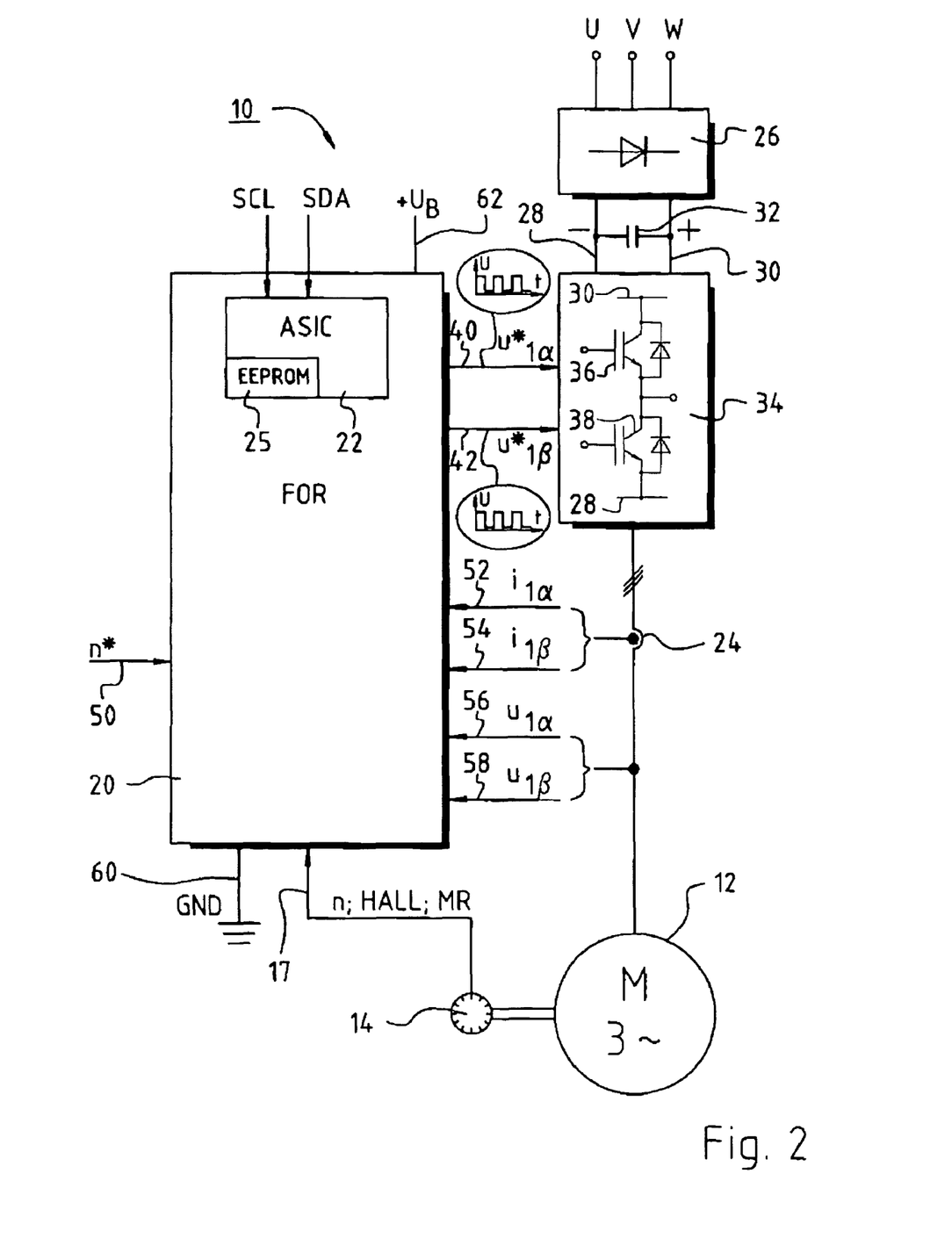
FIG. 2 schematically depicts a FOR system.

The signal from this sensor 214 is delivered to a controller 20, depicted in FIG. 2, for the field-oriented regulation (FOR) system.

FIG. 2 shows a control arrangement 10 for ASM 12. The latter has a sensor arrangement 14 for generating a rotation speed signal n, as well as a sensor arrangement 14A (FIG. 1) for generating a Hall signal HALL and a signal MR of a magnetoresistive resistor 18 (FIG. 2). A sensor magnet 274 (FIG. 3) is part of sensor arrangement 14.

The various signals n, HALL, MR are delivered to an associated multi-pin input 17 (FIG. 2) of a field-oriented regulator (FOR) 20 of known design. The latter contains a specific ASIC (Application-Specific Integrated Circuit) 22 that processes the MR signal in order to calculate therefrom the instantaneous rotational position of motor 12. The ASIC furthermore processes the HALL signal in order to calculate therefrom the instantaneous temperature of rotor 204. The HALL signal could also be sent directly outward to an ECU (Electronic Control Unit) 33 (FIG. 4), where temperature calculation would then occur.

Figure 3:
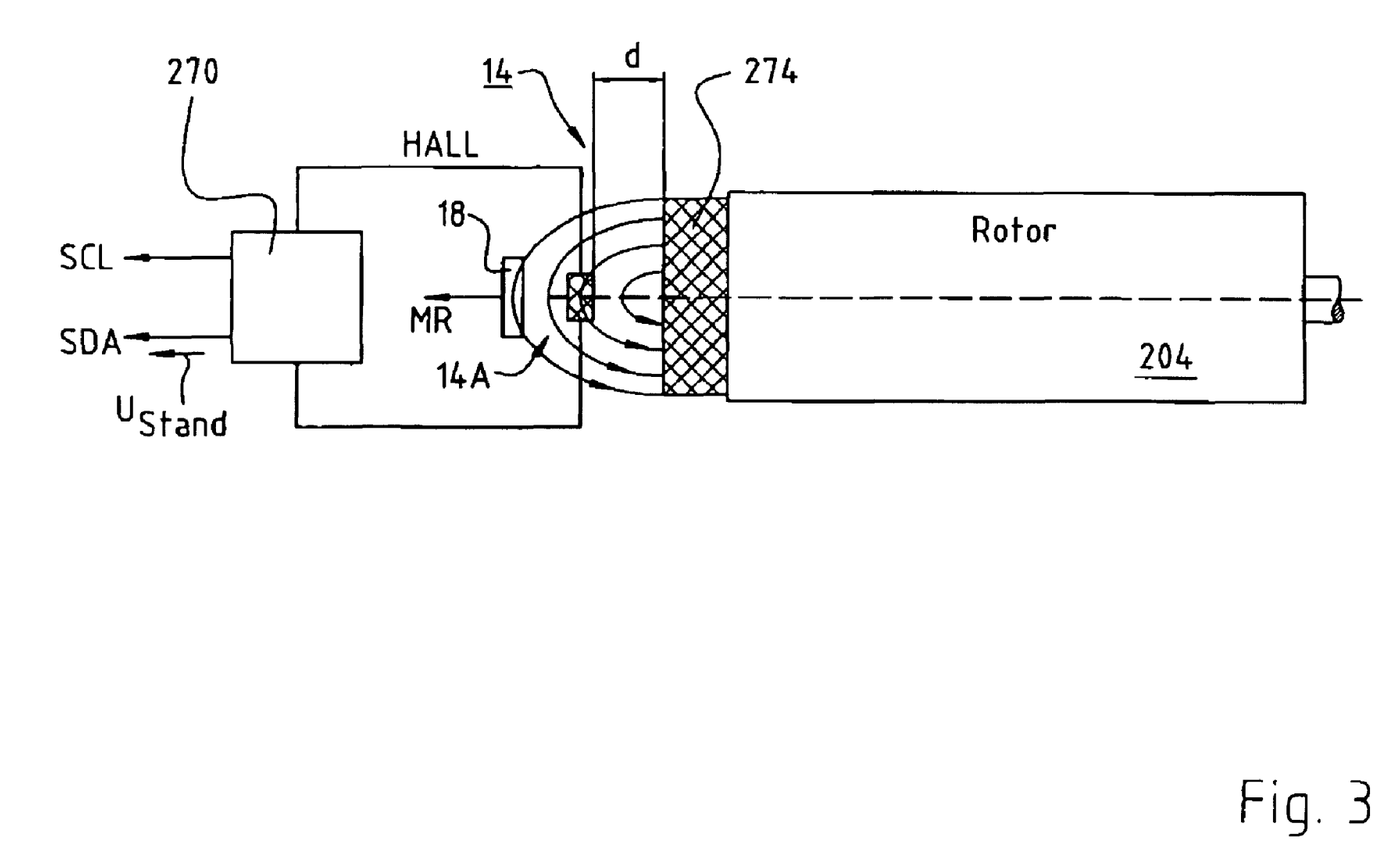
FIG. 3 is a schematic depiction to explain the invention.

For this, as shown in FIG. 3, at a predetermined temperature, e.g. 20° C., the HALL signal is delivered to a measurement arrangement 270. The latter generates therefrom a signal uStand, which is delivered to two inputs SCL and SDA of ASIC 22 as a motor data value, and stored there in an EEPROM (Electrically Erasable Programmable Read-Only Memory) 25 or another, preferably nonvolatile, memory. This signal is dependent on the distance d (FIG. 3) between Hall sensor 14A and sensor magnet 274 that is arranged on an end face of rotor 204 or is thermally conductively connected thereto, and is consequently at the temperature of the rotor. The value uStand therefore indicates the standardized value of the Hall signal HALL for the sensor magnet 274 that is being used, at a temperature of 20° C. and at distance d (which is always subject to small manufacturing variations among a series of motors). These variations are largely compensated by the calibration operation. Instead of "motor data," the term "motor system data" could also be used, in order to clarify that these are data relevant to the particular motor and the sensor as manufactured.

Sensor magnet 274 also controls magneto-resistor 18, which serves for exact sensing of the rotor position. The rotor position can, however, also be calculated directly from the Hall signal HALL.

A value n* for the desired rotation speed of motor 10 is also delivered at an input 50 to FOR 20. Also delivered thereto are, at inputs 52, 54, values i1, i2, i3 for the phase currents, and at inputs 56, 58, values u1, u2, u3 for the phase voltages of the respective phases of motor 12. Currents i1 etc. are measured, for example, by means of current transformers or measuring resistors 24 of known design, only one of which is depicted since FIG. 1 is a usual symbolic depiction of such a motor.

In this example, motor 12 is supplied with electrical energy via a rectifier 26 from a three-phase network U, V, W. Rectifier 26 feeds into a DC link circuit lead 28 (negative) and lead 30 (positive), to which a capacitor 32 is connected as a reactive current source. DC link circuit 28, 30 could of course be connected in the same fashion directly to a battery, e.g. to the battery of a vehicle, as is well known to the skilled artisan.

Connected to DC link circuit 28, 30 is a three-phase inverter 34, only one of whose three branches is depicted. The latter contains power MOSFETs (Metal Oxide Semiconductor Field Effect Transistors) 36, 38, which are controlled via associated outputs 40, 42 of FOR 20 by means of PWM (Pulse Width Modulation) pulses that are indicated symbolically in FIG. 2.

Because ASIC 22 of Hall sensor 14A (FIG. 3) receives the HALL signal that is dependent on temperature, and because a baseline value corresponding to a temperature of 20° C. is stored in EEPROM 25, ASIC 22 can continuously recalculate the instantaneous temperature and, proceeding therefrom, control the currents in motor 12 so as to yield the desired torque or desired rotation speed. In FIG. 3, magneto-resistor 18 is also controlled by the same sensor magnet 274, so that in this manner both the instantaneous rotation angle position of rotor 204 and the instantaneous rotor temperature can be calculated using only one sensor magnet 274, resulting in a very compact design.

Figure 4:
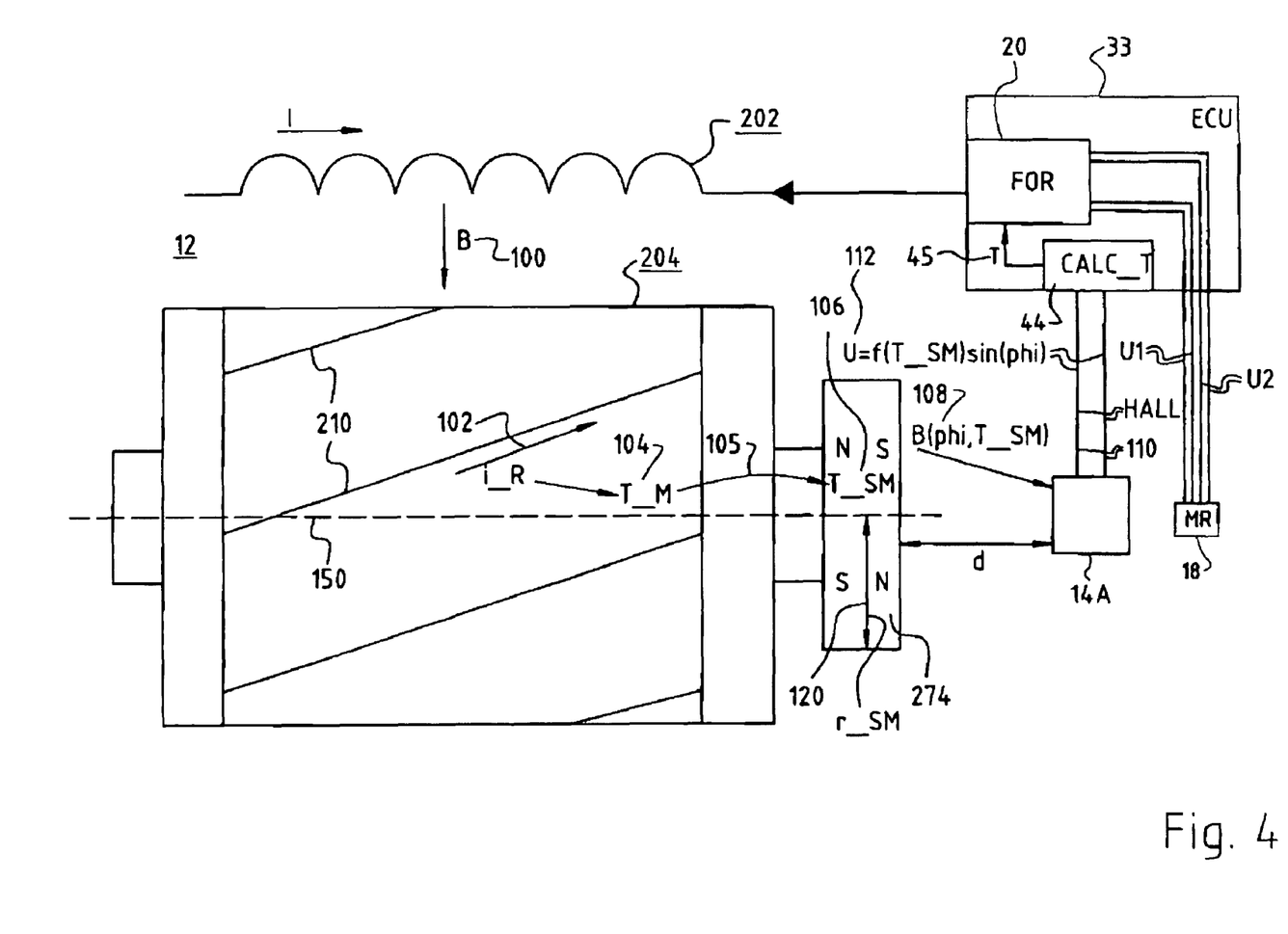
FIG. 4 schematically depicts measurement of a motor temperature by means of a galvanomagnetic sensor.

FIG. 4 schematically depicts stator 202; rotor 204, having short-circuit bars 210 and sensor magnet 274; galvanomagnetic sensor 14A; MR sensor 18 for sensing the rotor position angle phi; and ECU (Electronic Control Unit) 33, which has a FOR controller 20 and a temperature evaluation apparatus 44.

Stator 202 generates a magnetic flux density B 100 by which a current $i_R$ 102 is induced in short-circuit rotor 204. A torque at rotor 204 is also generated thereby, with the result that the rotor rotates and rotor position angle phi changes. Especially as a result of the resistance of short-circuit bars 210, current $i_R$ causes a power dissipation that increases temperature T_M 104 of rotor 204 and of motor 12 in general.

As a result of thermal transfer 105, in particular thermal conduction, temperature T_M 104 influences temperature T_SM 106 of sensor magnet 274, so that $$T\_SM = T\_M \quad (1).$$

For this purpose, sensor magnet 274 is nonrotatably secured to rotor 204, for example by way of a thermally conductive material.

Sensor magnet 274 rotates along with rotor 204 and generates a magnetic flux density B(phi,T_SM) 108 that is dependent on rotor position angle phi and on temperature T_SM 106 of sensor magnet 274, the amplitude of magnetic flux density B 108 decreasing with increasing temperature T_SM 106 of sensor magnet 274.

Galvanomagnetic sensor 14A detects magnetic flux density B 108 at the location of sensor 14A, and generates an output signal HALL 110 whose voltage U 112 takes substantially the form $$U = f(T\_SM) * \sin(phi) \quad (2).$$

Voltage U112, that is ascertained, is delivered to temperature evaluation apparatus CALC_T 44. By evaluating the amplitude f(T_SM), it is now possible to determine temperature T_SM 106 of sensor magnet 274, which temperature corresponds, to a good approximation, to temperature T_M 104 of short-circuit rotor 204. Temperature value T 45 that is ascertained is then delivered to FOR controller 20, and the latter can perform improved field-oriented regulation with the aid of value T 45 and rotor position angle phi ascertained by MR sensor 18.

A measurement of the temperature-dependent magnetic flux density 108 using a galvanomagnetic sensor 14A reacts more quickly to temperature changes in motor 12 than a measurement of the temperature at the location of sensor 14A (for example using an "NTC" Negative Temperature Coefficient resistor), since thermal transfer does not occur instantaneously, and a temperature measurement at the location of sensor 14A is therefore delayed in time with respect to the temperature of the motor.

Predetermined distance d (FIG. 3) between sensor magnet 274 and galvanomagnetic sensor 14A is preferably selected in such a way that it is approximately two-thirds of radius r_SM 120 of sensor magnet 274. For a preferred sensor magnet 274, r_SM is approximately 7 mm, and d is thus approximately 5 mm.

If a stator-side separating member or partition or cap 122 (FIG. 1) is provided between sensor 14A and sensor magnet 274, e.g. in order to protect sensor 14A from internal motor media such as, for example, oil, cap 122 is preferably implemented using a poorly thermally conductive material such as, for example, plastic, in order to reduce heating of sensor 14A. Additionally or alternatively, sensor 14A can be thermally connected in highly thermally conductive fashion to sensor housing 124 (FIG. 1), in order to keep the temperature of sensor 14A approximately at external temperature. In the case of galvanomagnetic sensors 14A having an output signal 110 that is dependent on the temperature of sensor 14A, this reduces the influence on output signal 110 due to heating of sensor 14A, thus simplifying evaluation.

Galvanomagnetic sensors 14A with compensation for dependence on the sensor temperature are preferably used. Such compensation is possible, for example, in the silicon of sensor 14A.

A suitable galvanomagnetic sensor 14A is, for example, the HW-101A Hall sensor of the Asahi Kasei EMD Corporation (AKE).

An approach without an MR sensor 18 or 18' is also possible. For this, two galvanomagnetic sensors 14A operating in an analog manner are used in order to generate two non-identical sine-wave signals, preferably a sine signal and a cosine signal. The temperature can then be ascertained either from one signal or from both signals.

Figure 5:
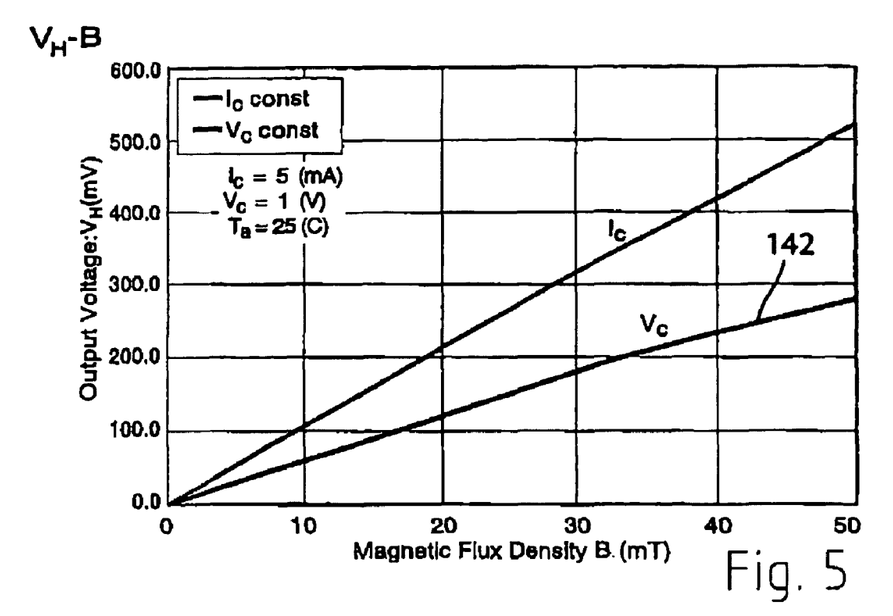
FIG. 5 shows an output voltage/magnetic flux density characteristic curve of a galvanomagnetic sensor.
Figure 6:
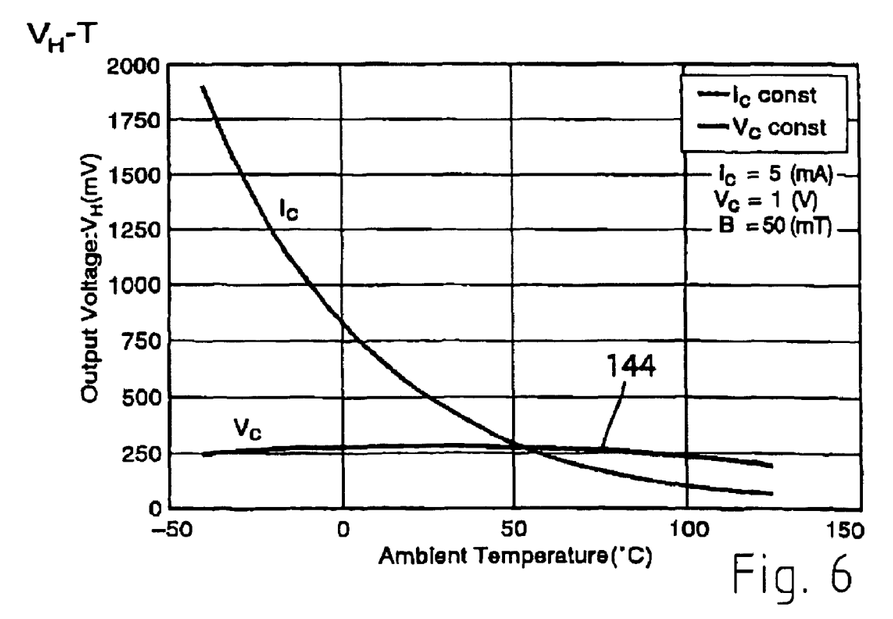
FIG. 6 shows an output voltage/temperature characteristic curve of the galvanomagnetic sensor of FIG. 5.

FIG. 5 shows, from the data sheet of the HW-101A Hall sensor, a $V_H$-B characteristic curve with output voltage $V_H$ and magnetic flux density B; and FIG. 6 shows a $V_H$-T characteristic curve with output voltage $V_H$ and temperature T. As is evident from curve 142 of FIG. 5, output voltage $V_H$ rises linearly with the absolute value of magnetic flux density B, provided the input voltage $V_C$ is held constant. It is evident from curve 144 in FIG. 6 that the value of output voltage $V_H$ remains substantially constant in the operating temperature region from −40° C. to +110° C. for a constant input voltage $V_C$.

Voltage U112 (FIG. 4) generated by Hall sensor 14A thus depends substantially on the (directionally independent) magnetic flux density B.

Figure 7:
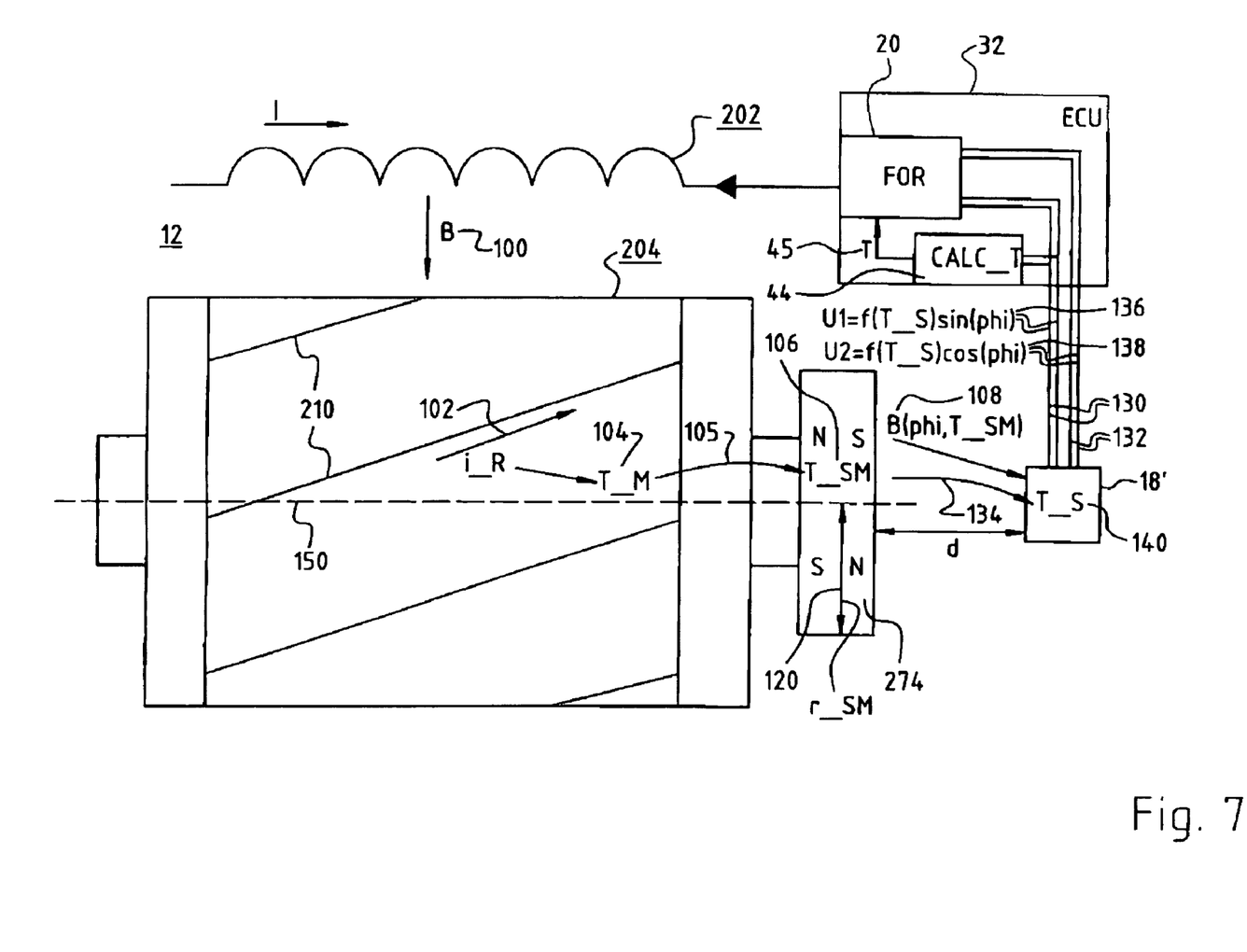
FIG. 7 schematically depicts the measurement of motor temperature by means of an MR (Magneto-Resistive) sensor 18'.

FIG. 7 schematically depicts a measurement of motor temperature T_M 104 using an MR sensor 18' arranged centrally with respect to rotor axis 150.

The mechanisms in stator 202 and rotor 204 relevant to the heating of motor 12 correspond to those of FIG. 4, and will not be described again.

The starting point is once again the fact that temperature T_SM of sensor magnet 274 represents a sufficient mapping of temperature T_M 104 of short-circuit rotor 204.

Unlike FIG. 4, MR sensor 18' (e.g. an Anisotropic Magneto-Resistive (AMR), a Giant Magneto-Resistive (GMR), or a Colossal Magneto-Resistive (CMR) sensor) is positioned relative to sensor magnet 274 in such a way that a thermal transfer 134 takes place from sensor 274 to sensor 18', in particular by thermal radiation and convection. Model GF705 from Sensitec GmbH of Lahnau, Germany is suitable as a GMR sensor.

When an MR sensor 18' having outputs 130, 132 is used, output signals 136, 138

$$U1 = f(T\_S)\sin(phi) \quad (3)$$

$$U2 = f(T\_S)\cos(phi) \quad (4)$$

depend on rotor position angle phi and on temperature T_S 140 of sensor 18', and they are delivered to ECU 33, in which, for example, output voltage U1 is delivered to temperature evaluation apparatus CALC_T in order to ascertain temperature T, and output voltages U1 and U2 are delivered to FOR controller 20 in order to ascertain rotor position angle phi.

It is preferred to use MR sensors 18' whose output signals 130, 132 depend, in the specified region, very little on the strength of magnetic flux density B 108, but instead principally on the direction thereof (also called the magnetic field direction), or to use sensors in which the dependence on magnetic flux density B at least is less than the dependence on the temperature of MR sensor 18'.

In the case of the KMZ43T MR sensor of Philips Electronics NV, for example, the output voltage drops by approximately 0.29%/K as temperature T_S rises, and in the working region (usually in the saturation region with respect to magnetic flux density B), said voltage is substantially independent of the magnitude of magnetic flux density B. The working region with respect to temperature is −40° C. to +125° Celsius.

By evaluating amplitude f(T_S) in CALC_T 44, temperature (T_S) 140 of sensor 18' can be determined, said temperature corresponding approximately to temperature T_SM 106 of sensor magnet 274; this temperature in turn corresponds, to a good approximation, to temperature (T_M) 104 of short-circuit rotor 204.

Because of the double indirect measurement, the measurement is not as accurate as, for example, a direct measurement in short-circuit rotor 204 or a measurement using a galvanomagnetic sensor as in FIG. 4, especially in a context of rapidly changing temperatures, but is still accurate enough for many applications. The approach is very favorable because both rotor position angle phi and the approximate temperature (T_M) 104 of short-circuit rotor 204 can be ascertained using MR sensor 140.

Predetermined distance d between sensor magnet 274 and MR sensor 18' is preferably selected to be small, e.g. 1 mm to 4 mm, more preferably 1.5 to 3 mm, in order to enable good thermal transfer 134.

As in the case of the variant having galvanomagnetic sensor 14A, here as well, a stator-side partition or cap 122 (FIG. 1) can be provided between sensor 18' and sensor magnet 274 in order to protect sensor 18'.

For good thermal transfer 134, partition 122 is fabricated from a highly thermally conductive material such as, for example, a metal, in particular aluminum.

In addition, sensor 18 or 18' can be thermally insulated with respect to the usually highly-thermally-conductive sensor housing 124 (FIG. 1), in order to reduce cooling caused by the latter.

Figure 8:
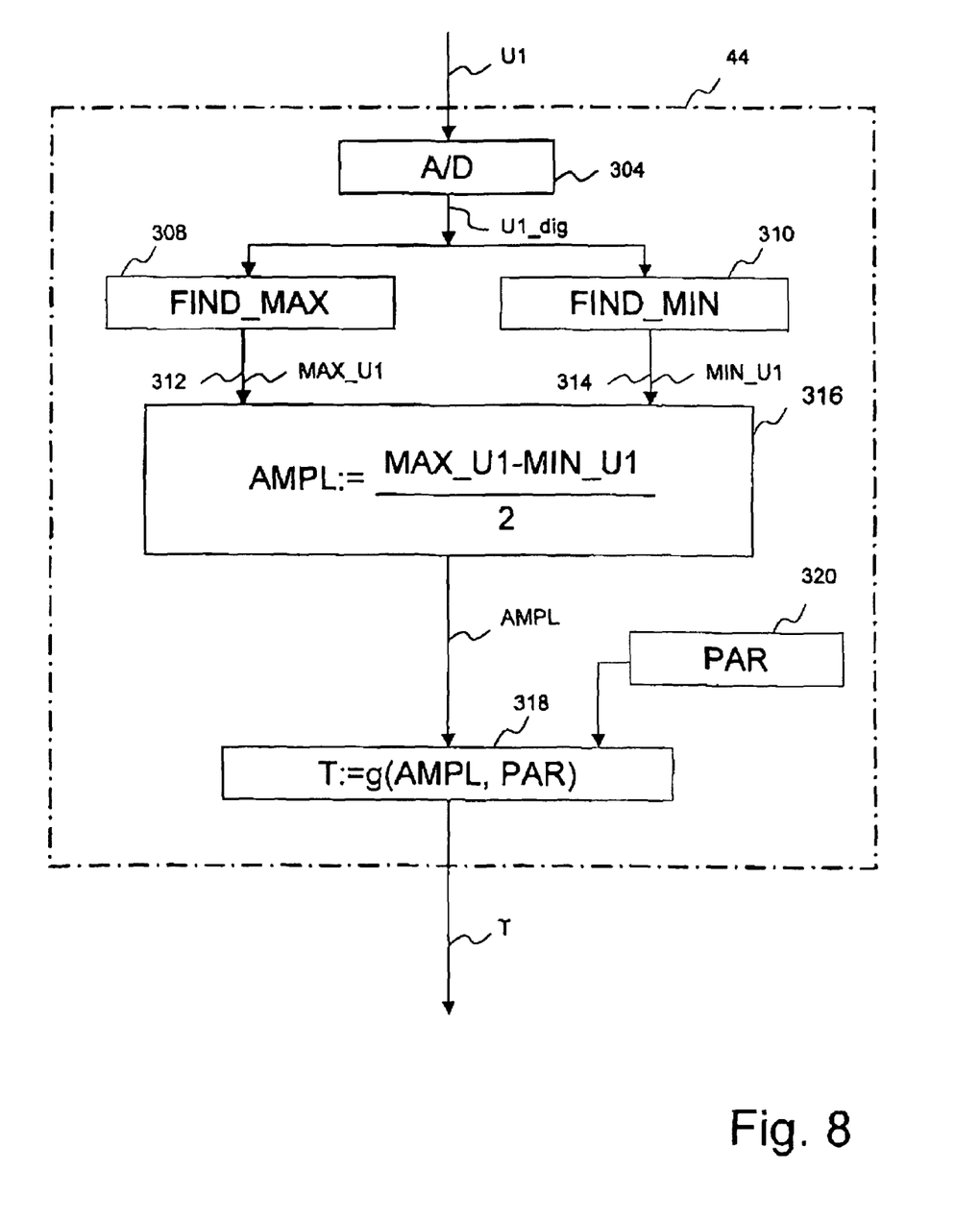
FIG. 8 schematically depicts an evaluation apparatus for processing the temperature-dependent signal from a sensor.

FIG. 8 shows an exemplifying embodiment of a temperature evaluation apparatus (temperature ascertaining apparatus, temperature sensing apparatus) 44 for evaluating a temperature-dependent sensor signal U1 from a galvanomagnetic sensor 14A (FIG. 4) or from an MR sensor 18' (FIG. 7).

Apparatus 44 is implemented here as an ASIC, but can also be embodied, for example, in a microprocessor or microcontroller.

The temperature-dependent signal U1 is delivered to an A/D (Analog-to-Digital) converter 304, where it is digitized. Output signal U1_dig is delivered to a FIND_MAX function 308 and to a FIND_MIN function 310 that ascertain, for example over a predetermined time span, the maximum value MAX_U1 312 and minimum value MIN_U1 314. This is done by, for example, ascertaining the greatest value and smallest value during one period of the sinusoidal signal U1.

Amplitude AMPL is then calculated at 316 by calculating half the difference between maximum value MAX_U1 and minimum value MIN_U1.

At 318 temperature T is then ascertained by means of a function g(AMPL, PAR), from amplitude AMPL and, if applicable, from further parameters PAR that are dependent on the motor or sensor. Motor-dependent parameters PAR are stored, for example, in an EEPROM 320 (FIG. 8). The temperature determination can be dependent, for example, on the measurement method, sensor type, sensor arrangement, production series variations during sensor manufacture, etc. For applications with lesser accuracy requirements or low tolerances, parameters PAR 320 can be predefined for the motor type; for greater accuracy requirements or high tolerances, however, an at least partial stipulation of parameters ascertained for each individual rotor 204 may also be necessary, in which context, for example, measurements are performed at predetermined temperatures.

If two rotor position signals are present, as is the case for example when an MR sensor or two galvanomagnetic sensors are used, the temperature can be ascertained either from only one of the two signals, or from both. When a sine signal and cosine signal are detected, they can be plotted in known fashion as a circle, and the temperature is determined from the radius of the circle.

The present method of temperature measurement can also be used with BLDC (Brush-Less Direct Current) motors or electronically commutated DC motors to permit, in such motors, regulation with a more accurate motor model.

It is also possible to use sensors 14A or 18, 18' that are dependent, inter alia, both on the absolute value of magnetic flux density B and on temperature T_S of sensor 18, 18'. This may complicate evaluation, however, and the effects can cancel or negatively affect one another. When such a sensor is used, the characteristic curve of the ascertained voltage as a function of motor temperature must be measured beforehand, as applicable, in motor 12.

When at least two sensors are used, it is advantageous to arrange both on a common circuit board. With two galvanomagnetic sensors, both are preferably arranged on the same side of the circuit board; with one galvanomagnetic and one MR sensor, preferably either both sensors are arranged on the same side of the circuit board, or one of the sensors is arranged on the front side of the circuit board and the other on its back side. MR sensors are preferably arranged in the region of rotation axis 150 (FIG. 4, FIG. 7) of the rotor or of sensor magnet 106, and thus centrally; while galvanomagnetic sensors, especially when used exclusively to ascertain temperature, can be positioned relatively freely provided the magnetic flux density at the selected position is high enough.

Many variants and modifications are of course possible within the scope of the invention.

What is claimed is:

1. An electronically commutated asynchronous motor (12) comprising:
    a stator (202),
    a short-circuit rotor (204),
    a controller (20) for field-oriented regulation (FOR) of the motor (12),
    a sensor magnet (274) that is in thermally conductive connection with the short-circuit rotor (204),
    a rotor position sensor (14A; 18; 18') arranged at a distance (d) from said sensor magnet (274) to generate, during operation, an output signal (HALL, U, U1, U2) that is dependent upon the spatial orientation of the sensor magnet (274),
    a temperature evaluation apparatus (CALC_T 44) that is configured to ascertain during operation, from the output signal (HALL, U, U1, U2), a temperature value (T) that is suitable for characterizing a temperature (T_SM, T_S) in the motor (12), and
    a data memory (25, 320) for storing motor system data measured at the motor (12) during operation at a predetermined temperature.

2. The motor according to claim 1, wherein
    the temperature value (T) is adapted for characterizing the temperature of the short-circuit rotor (204) within the motor.

3. The motor according to claim 1, wherein the temperature evaluation apparatus (CALC_T 44) is configured to apply the ascertained temperature value (T) to the controller for field-oriented regulation (20).

4. The motor according to claim 1, wherein
    the temperature evaluation apparatus (CALC_T 44) is configured to generate, as a function of the stored motor system data and of the output signal of the rotor position sensor (14A; 18; 18'), a value (T) characterizing the temperature (T_SM, T_S) in the motor (12).

5. The motor according to claim 1,
    which is implemented to also ascertain the rotor position of the short-circuit rotor (204) from the output signal (HALL, U, U1, U2) of the rotor position sensor (14A).

6. The motor according to claim 1, wherein
    the temperature evaluation apparatus (CALC_T 44) is implemented to ascertain the temperature value (T) from the amplitude of the output signal (HALL, U, U1, U2).

7. The motor according to claim 1, further comprising a separating member (122) between the sensor magnet (274) and the rotor position sensor (14A).

8. The motor according to claim 1, wherein
    the rotor position sensor (14A) is a galvanomagnetic sensor.

9. The motor according to claim 1, wherein
    the rotor position sensor (14A) is a Hall sensor.

10. The motor according to claim 1, wherein
    the rotor position sensor (14A) is implemented to generate an output signal (110) that depends upon an absolute value of the magnetic flux density (B 108) generated by the sensor magnet (274).

11. The motor according to claim 10, wherein
    the amplitude of the output signal (110) depends on the absolute value of the magnetic flux density (B 108) generated by the sensor magnet (274).

12. The motor according to claim 1, wherein
    the rotor position sensor (14A) is implemented to ascertain an output signal value (HALL, U) that is dependent upon the temperature (T_SM) of the sensor magnet (274).

13. The motor according to claim 1, wherein
    a separating member (122) made of plastic is provided between the sensor magnet (274) and the rotor position sensor (14A).

14. The motor according to claim 1, wherein
    the rotor position sensor (18, 18') is an MR sensor.

15. The motor according to claim 1, wherein
    the rotor position sensor (18, 18') is implemented to generate, in operation, an output signal (U1, U2) that depends upon the direction of the magnetic flux density (B(phi)) generated by the sensor magnet (274).

16. The motor according to claim 15, wherein
    the rotor position sensor (18, 18') is implemented to generate an output signal (U1, U2) whose amplitude depends on the direction of the magnetic flux density (B(phi)) generated by the sensor magnet (274).

17. The motor according to claim 15, wherein
the rotor position sensor (18, 18') is implemented to generate an output signal (U1, U2) that is dependent on the temperature of the rotor position sensor (18, 18').

18. The motor according to claim 1, wherein
a separating member (122) that enables good thermal transfer between the sensor magnet (274) and the rotor position sensor (18, 18') is provided between the sensor magnet (274) and the rotor position sensor (18, 18').

19. The motor according to claim 1, wherein
the motor has a sensor housing (124) for the rotor position sensor (14A), the rotor position sensor (14A) being connected in a thermally insulated manner to said sensor housing (124).

20. An electronically commutated asynchronous motor (12) comprising:
a stator (202); a short-circuit rotor (204); and
a controller (20) for field-oriented regulation of said motor (12);
a sensor magnet (274) being provided in thermally conductive connection with the short-circuit rotor (204),
a galvanomagnetic sensor (14A), whose output signal (HALL) is a function of the magnetic flux density (B) generated by the sensor magnet (274) at the galvanomagnetic sensor (14A), and thus of the temperature of the short-circuit rotor (204), being provided on the stator (202) at a predetermined distance (d) from said sensor magnet (274); and
a temperature evaluation apparatus that is implemented to generate, from the output signal of the galvanomagnetic sensor, a value characterizing the temperature of the short-circuit rotor (204), and to deliver said value to the controller for field-oriented regulation (20).

21. The motor according to claim 20, wherein
the galvanomagnetic sensor (14A) is a Hall sensor.

22. The motor according to claim 20, further comprising
a data memory (25, 320) for storing motor data measured at the motor (12) during operation at a predetermined temperature.

23. The motor according to claim 20, further comprising
a data memory (25) for storing motor data measured at the motor (12) during operation at a predetermined temperature,
and wherein the temperature evaluation apparatus (20) is implemented to generate the value characterizing the temperature of the short-circuit rotor (204) as a function of the stored motor data and of the output signal of the galvanomagnetic sensor (14A).

24. The motor according to claim 20,
which is implemented also to ascertain, from the output signal of the galvanomagnetic sensor (14A), the angular position (phi) of the short-circuit rotor (204).

25. The motor according to claim 20, wherein
the sensor magnet (274) also has, associated with it, a magnetoresistor (18, 18') whose output signal (MR) serves to supply a datum regarding the rotational position (phi) of the short-circuit rotor (204).

* * * * *